United States Patent
Rice et al.

(10) Patent No.: US 12,214,755 B2
(45) Date of Patent: *Feb. 4, 2025

(54) AUTONOMOUS VEHICLE SENSOR CLEANING SYSTEM

(71) Applicant: Aurora Operations, Inc., Pittsburgh, PA (US)

(72) Inventors: Wesly Mason Rice, Glenshaw, PA (US); Nikolaus Wittenstein, Glenshaw, PA (US); Zhizhuo Jin, Pittsburgh, PA (US); Paul Kevin Smith, Wexford, PA (US); Sean Joseph Kennelly, Glenshaw, PA (US); Peter Brueckner, Pittsburgh, PA (US); David Patrick Rice, Wexford, PA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/473,779

(22) Filed: Sep. 25, 2023

(65) Prior Publication Data
US 2024/0010168 A1 Jan. 11, 2024

Related U.S. Application Data

(63) Continuation of application No. 17/825,014, filed on May 26, 2022, now Pat. No. 11,801,808, which is a continuation of application No. 16/723,124, filed on Dec. 20, 2019, now abandoned, which is a continuation of application No. 15/482,251, filed on Apr. 7, 2017, now Pat. No. 10,518,754.

(51) Int. Cl.
*B60S 1/48* (2006.01)
*B60S 1/52* (2006.01)
(Continued)

(52) U.S. Cl.
CPC ............... *B60S 1/481* (2013.01); *B60S 1/52* (2013.01); *B60S 1/54* (2013.01); *B60S 1/56* (2013.01)

(58) Field of Classification Search
CPC .. B60S 1/0848; B60S 1/46; B60S 1/48; B60S 1/481; B60S 1/485; B60S 1/486;
(Continued)

(56) References Cited

U.S. PATENT DOCUMENTS 5,333,836 A * 8/1994 Fukuyo ................. B60T 8/3675
303/119.2
10,518,754 B2 * 12/2019 Rice ......................... B60S 1/481
(Continued)

FOREIGN PATENT DOCUMENTS

| DE | 10 2016 100326 | 7/2016 |
|---|---|---|
| EP | 2955069 | 12/2015 |
| EP | 3069942 | 9/2016 |

OTHER PUBLICATIONS

Partial International Search Report for PCT/US2018/024556 mailed on Jul. 2, 2018, 14 pages.

*Primary Examiner* — David G Cormier
(74) *Attorney, Agent, or Firm* — Dority & Manning, P.A.

(57) ABSTRACT

The present disclosure provides a sensor cleaning system that cleans one or more sensors of an autonomous vehicle. Each sensor can have one or more corresponding sensor cleaning units that are configured to clean such sensor using a fluid (e.g., a gas or a liquid). Thus, the sensor cleaning system can include both a gas cleaning system and a liquid cleaning system. According to one aspect, the sensor cleaning system can provide individualized cleaning of the autonomous vehicle sensors. According to another aspect, a liquid cleaning system can be pressurized or otherwise powered by the gas cleaning system or other gas system.

19 Claims, 6 Drawing Sheets

(51) Int. Cl.
B60S 1/54 (2006.01)
B60S 1/56 (2006.01)

(58) Field of Classification Search
CPC ...... B60S 1/50; B60S 1/52; B60S 1/54; B60S 1/544; B60S 1/546; B60S 1/56; B60S 1/62; B60S 1/66; B08B 3/02; B08B 5/02; B08B 7/04; B08B 2203/027; B08B 2205/00

See application file for complete search history.

(56) References Cited

U.S. PATENT DOCUMENTS

| | | | |
|---|---|---|---|
| 10,857,980 B2* | 12/2020 | Rice | ............................ B60S 1/54 |
| 11,801,808 B2* | 10/2023 | Rice | ............................ B60S 1/56 |
| 2007/0291130 A1 | 12/2007 | Broggi et al. | |
| 2010/0154534 A1* | 6/2010 | Hampton | ............... G01F 23/268 |
| | | | 73/304 C |
| 2013/0152979 A1 | 6/2013 | Mueller et al. | |
| 2014/0010408 A1 | 1/2014 | Irie et al. | |
| 2014/0232869 A1 | 8/2014 | May et al. | |
| 2014/0270379 A1 | 9/2014 | Snider | |
| 2014/0367488 A1* | 12/2014 | Dominique | ............. B60S 1/481 |
| | | | 239/284.1 |
| 2015/0032292 A1 | 1/2015 | Stratton | |
| 2015/0040953 A1 | 2/2015 | Kikuta et al. | |
| 2015/0192115 A1 | 7/2015 | Seith | |
| 2015/0245587 A1 | 9/2015 | Van Den Berg et al. | |
| 2015/0329083 A1 | 11/2015 | Kiyohara et al. | |
| 2016/0052644 A1 | 2/2016 | Chin et al. | |
| 2017/0182980 A1 | 6/2017 | Davies et al. | |
| 2017/0313287 A1 | 11/2017 | Davies et al. | |
| 2018/0143298 A1 | 5/2018 | Newman | |
| 2018/0265048 A1 | 9/2018 | Schmidt | |

* cited by examiner

AUTONOMOUS VEHICLE SENSOR CLEANING SYSTEM

PRIORITY CLAIM

The present application is a continuation of U.S. application Ser. No. 17/825,014 having a filing date of May 26, 2022, which is a continuation of U.S. application Ser. No. 16/723,124 having a filing date of Dec. 20, 2019. U.S. application Ser. No. 16/723,124 is a continuation of U.S. application Ser. No. 15/482,251 having a filing date of Apr. 7, 2017, and issued as U.S. Pat. No. 10,518,754 on Dec. 31, 2019. Applicant claims priority to and the benefit of each of such applications and incorporates all such applications herein by reference in its entirety.

FIELD

The present disclosure relates generally to a sensor cleaning system. More particularly, the present disclosure relates to a sensor cleaning system that features individualized cleaning of sensors included in an autonomous vehicle and/or that features a liquid sensor cleaning system that is gas-pressurized.

BACKGROUND

An autonomous vehicle is a vehicle that is capable of sensing its environment and navigating with little to no human input. In particular, an autonomous vehicle can observe its surrounding environment using a variety of sensors and can attempt to comprehend the environment by performing various processing techniques on sensor data collected by the sensors. Given knowledge of its surrounding environment, the autonomous vehicle can identify an appropriate motion path through such surrounding environment.

Thus, a key objective associated with an autonomous vehicle is the ability to perceive the location of objects that are proximate to the autonomous vehicle and/or determine other information about the autonomous vehicle and its relationship to the surrounding environment. One aspect such objective is the collection of sensor data by the variety of sensors included in or otherwise coupled to the vehicle.

However, autonomous vehicle sensors can suffer from the presence of debris, contaminants, or environmental objects which interfere with the ability of the sensor to collect the sensor data. As one example, rain, snow, frost, or other weather-related conditions can degrade the quality of the sensor data collected by a given sensor when present. For example, raindrops, snow, or other condensation can collect on the lens or other components of a sensor (e.g., a camera or a Light Detection and Ranging (LIDAR) sensor), thereby degrading the quality of the sensor data collected by the sensor. As another example, dirt, dust, road salt, organic matter (e.g., "bug splatter," pollen, bird droppings, etc.), or other contaminants can accumulate on or adhere to a given sensor (e.g., on the sensor cover, housing, or other external component of the sensor), thereby degrading the quality of the sensor data collected by the sensor.

SUMMARY

Aspects and advantages of embodiments of the present disclosure will be set forth in part in the following description, or can be learned from the description, or can be learned through practice of the embodiments.

One example aspect of the present disclosure is directed to a sensor cleaning system that provides individualized cleaning of autonomous vehicle sensors. The sensor cleaning system includes a plurality of sensor cleaning units configured to respectively clean a plurality of sensors of an autonomous vehicle. The sensor cleaning system includes a fluid source that supplies a fluid. The sensor cleaning system includes a plurality of flow control devices that respectively control a flow of the fluid from the fluid source to the plurality of sensor cleaning units. The sensor cleaning system includes one or more controllers that include one or more processors. The one or more controllers are configured to individually control each respective flow control device to allow the flow of the fluid to the corresponding sensor cleaning unit to enable the corresponding sensor cleaning unit to individually clean the corresponding sensor.

Another example aspect of the present disclosure is directed to a computer-implemented method to clean autonomous vehicle sensors. The method includes obtaining, by one or more computing devices, a plurality of sets of sensor data respectively generated by a plurality of sensors of an autonomous vehicle. A plurality of sensor cleaning units are configured to respectively clean the plurality of sensors. The method includes performing, by the one or more computing devices, an analysis of each set of sensor data to determine whether the corresponding sensor requires cleaning. The method includes identifying, by the one or more computing devices, an individual one of the plurality of sensors that requires cleaning based at least in part on the analysis of the corresponding set of sensor data. The method includes controlling, by the one or more computing devices, a flow of a fluid to an individual one of the plurality of sensor cleaning units to enable such sensor cleaning unit to clean the identified individual sensor.

Another example aspect of the present disclosure is directed to an autonomous vehicle. The autonomous vehicle includes a plurality of sensors and a sensor cleaning system that performs individualized cleaning of the plurality of sensors of the autonomous vehicle. The sensor cleaning system includes a plurality of sensor cleaning units configured to respectively clean the plurality of sensors of the autonomous vehicle. The sensor cleaning system includes a fluid source that supplies a fluid. The sensor cleaning system includes a plurality of flow control devices that respectively control a flow of the fluid from the fluid source to the plurality of sensor cleaning units. The sensor cleaning system includes one or more controllers that include one or more processors. The one or more controllers are configured to determine that a first sensor of the plurality of sensors requires cleaning. The one or more controllers are configured to individually control a first flow control device that corresponds to a first sensor cleaning unit that corresponds to the first sensor to allow the flow of the fluid to the first sensor cleaning unit to enable the first sensor cleaning unit to individually clean the first sensor.

Another example aspect of the present disclosure is directed to a liquid sensor cleaning system that is gas-pressurized. The liquid sensor cleaning system includes one or more sensor cleaning units configured to respectively use a liquid to respectively clean one or more sensors of an autonomous vehicle. The liquid sensor cleaning system includes a liquid tank that holds a pressurized volume of the liquid. The liquid sensor cleaning system includes one or more flow control devices that control a flow of the liquid from the liquid tank to the one or more sensor cleaning units. The liquid sensor cleaning system includes a pressure transfer device that uses a first volume of a gas to pressurize the liquid held in the liquid tank.

Another example aspect of the present disclosure is directed to an autonomous vehicle. The autonomous vehicle includes one or more sensors and a sensor cleaning system that performs cleaning of the one or more sensors of the autonomous vehicle. The sensor cleaning system includes one or more sensor cleaning units configured to respectively use a liquid to respectively clean the one or more sensors. The sensor cleaning system includes a liquid tank that holds a pressurized volume of the liquid. The sensor cleaning system includes one or more flow control devices that control a flow of the liquid from the liquid tank to the one or more sensor cleaning units. The sensor cleaning system includes a pressure transfer device that uses a first volume of a gas to pressurize the liquid held in the liquid tank.

Another example aspect of the present disclosure is directed to a pressure transfer device for use in gas-pressurizing a liquid sensor cleaning system of an autonomous vehicle. The pressure transfer device includes a first chamber that holds a first volume of gas. The pressure transfer device includes a second chamber that holds a second volume of the liquid. The pressure transfer device includes a partition physically located between the first chamber and the second chamber. The partition is at least one of deformable and movable in response to a difference in respective pressures associated with the first and the second chambers.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
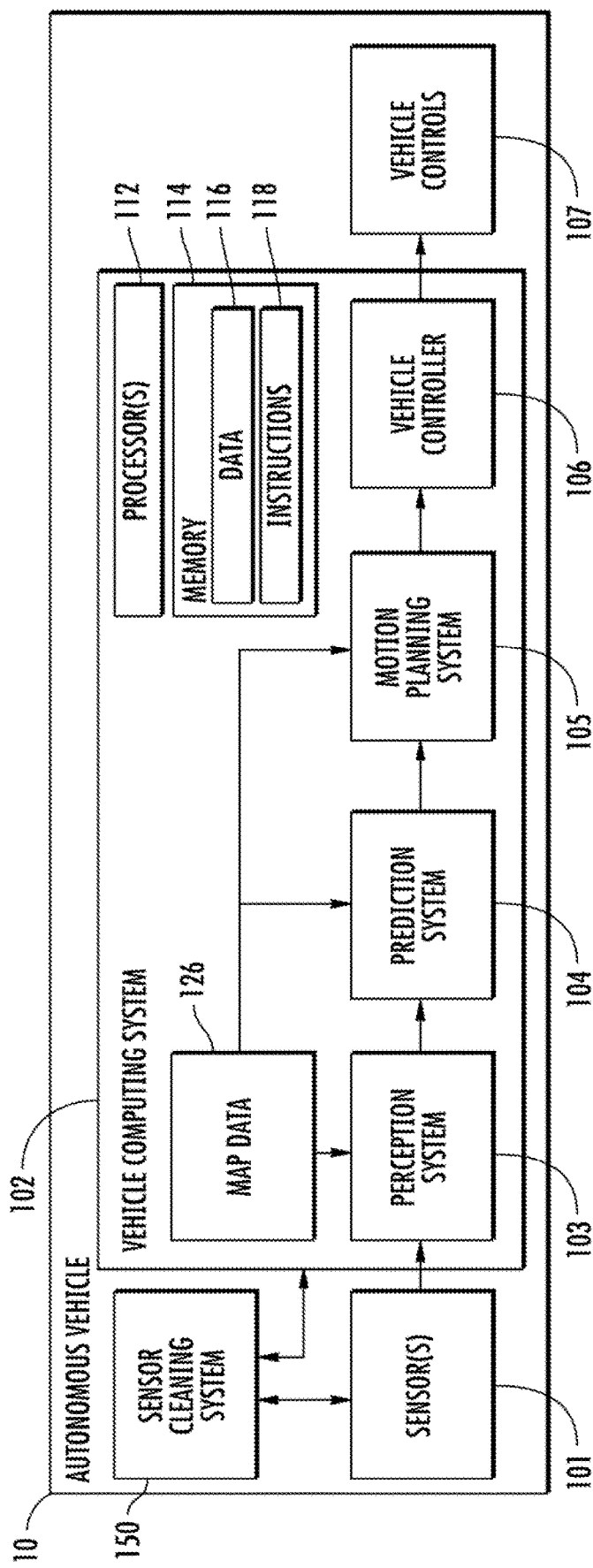
FIG. 1 depicts a block diagram of an example autonomous vehicle according to example embodiments of the present disclosure.

Generally, the present disclosure is directed to a sensor cleaning system that cleans one or more sensors of an autonomous vehicle. In particular, in some implementations of the present disclosure, the sensor cleaning system can include a plurality of sensor cleaning units that are configured to respectively clean a plurality of sensors of the autonomous vehicle using a fluid (e.g., a gas or a liquid). For example, the plurality of sensors can include one or more cameras, Light Detection and Ranging (LIDAR) system sensors, Radio Detection and Ranging (RADAR) system sensors, and/or other sensors. Thus, each sensor can have one or more corresponding sensor cleaning units that are configured to clean such sensor using a fluid (e.g., a gas or a liquid).

According to one aspect of the present disclosure, in some implementations, the sensor cleaning system can provide individualized cleaning of the autonomous vehicle sensors. For example, one or more controllers of the sensor cleaning system can individually control the flow of a corresponding fluid to each sensor cleaning unit to enable individualized cleaning of the sensors. In addition, in some implementations, the one or more controllers can determine whether each sensor requires cleaning based at least in part on the respective sensor data collected by each sensor. The individualized cleaning of sensors improves the efficiency of the cleaning system and eliminates instances in which the all of the sensors are simultaneously cleaned, thereby eliminating instances in which the entire sensor system is temporarily "blinded."

According to another aspect of the present disclosure, in some implementations, the sensor cleaning system can include both a gas cleaning system and a liquid cleaning system. As an example, in some implementations, a particular sensor can have associated therewith (e.g., physically coupled and/or adjacent thereto) a gas cleaning unit configured to use a gas to clean such sensor and/or a liquid cleaning unit configured to use a liquid to clean such sensor.

As such, according to yet another aspect of the present disclosure, in some implementations, the liquid cleaning system can be pressurized or otherwise powered by the gas cleaning system or other gas system. In particular, in some implementations, the sensor cleaning system can include a pressure transfer device that uses a first volume of a gas to pressurize the liquid used by the liquid cleaning system. Use of the gas cleaning system to pressurize the liquid cleaning system enables the use of liquids at much higher pressures than can be achieved by alternative liquid cleaning systems that rely upon, for example, a pump to provide the flow of liquid to the liquid cleaning units.

More particularly, an autonomous vehicle can be a ground-based autonomous vehicle (e.g., car, truck, bus, etc.), an air-based autonomous vehicle (e.g., airplane, drone, helicopter, or other aircraft), or other types of vehicles (e.g., watercraft). In some implementations, the autonomous vehicle can include a vehicle computing system that assists in controlling the autonomous vehicle. In particular, in some implementations, the vehicle computing system can receive sensor data from one or more sensors that are coupled to or otherwise included within the autonomous vehicle. As examples, the one or more sensors can include one or more LIDAR sensors, one or more RADAR sensors, one or more cameras (e.g., visible spectrum cameras, infrared cameras, etc.), and/or other sensors. The sensor data can include information that describes the location of objects within the surrounding environment of the autonomous vehicle.

In some implementations, the sensors can be located at various different locations on the autonomous vehicle. As an example, in some implementations, one or more cameras and/or LIDAR sensors can be located in a pod or other structure that is mounted on a roof of the autonomous vehicle while one or more RADAR sensors can be located in or behind the front and/or rear bumper(s) or body panel(s) of the autonomous vehicle. As another example, camera(s) can be located at the front or rear bumper(s) of the vehicle as well. Other locations can be used as well.

The autonomous vehicle can include a sensor cleaning system that cleans the one or more sensors of an autonomous vehicle using a fluid (e.g., a gas or a liquid). Thus, the sensor cleaning system can include a gas cleaning system that cleans the sensors using a gas (e.g., compressed air); a liquid cleaning system that cleans the sensors using a liquid (e.g., windshield washer fluid); or both the gas cleaning system and the liquid cleaning system.

In particular, in some implementations, the sensor cleaning system can include a plurality of sensor cleaning units that are configured to respectively clean a plurality of sensors of the autonomous vehicle. In some implementations, the sensor cleaning units can include gas-based cleaning units that use a gas to clean the sensors. For example, one or more of the gas cleaning units can be an air knife that uses a "knife" of air to clean the sensor. In some implementations, the sensor cleaning units can include liquid-based cleaning units that use a liquid to clean the sensors. For example, one or more of the liquid cleaning units can include a nozzle that sprays the liquid onto the sensor to clean the sensor. In some implementations, a sensor cleaning unit can be configured to clean a sensor using selectively the gas and the liquid. For example, the sensor cleaning unit can include two inflow lines respectively for the gas and the liquid and two different nozzles that respectively spray or otherwise release the gas and the liquid.

As described above, the plurality of sensors can include a number of different types of sensors and, in some instances, a given sensor might have a gas cleaning unit and/or a liquid cleaning unit associated therewith. As one example, in some implementations, each camera and/or LIDAR sensor can have both of a gas cleaning unit and a liquid cleaning unit associated therewith; while each RADAR sensor can have only a liquid cleaning unit associated therewith. Other combinations of sensors and cleaning units can be used as well.

The cleaning system can include one or more fluid source(s) that supply one or more fluid(s). As an example, for a gas cleaning system, the fluid source(s) can include a tank that stores a pressurized volume of a gas. For example, the tank can store pressurized air received from a compressor. As another example, for a liquid cleaning system, the fluid source(s) can include a liquid reservoir that stores a liquid (e.g., a windshield washer liquid reservoir). The fluid cleaning system can include a pump that pumps the liquid from the liquid reservoir to the liquid-based sensor cleaning units. As yet another example, for a liquid cleaning system, the fluid source can include a tank that stores a pressurized volume of the liquid. For example, in some implementations, the volume of liquid can be pressurized using a pressurized gas.

According to an aspect of the present disclosure, in some implementations, the sensor cleaning system can provide individualized cleaning of the autonomous vehicle sensors. For example, in some implementations, the sensor cleaning system can include a plurality of flow control devices that respectively control a flow of the fluid from the fluid source to the plurality of sensor cleaning units. One or more controllers can individually control each flow control device to allow the flow of the fluid to the corresponding sensor cleaning unit to enable the corresponding sensor cleaning unit to individually clean the corresponding sensor.

As one example, the plurality of flow control devices can include a plurality of solenoids that are individually controllable by the one or more controllers to respectively allow or disallow the flow of the fluid to the corresponding sensor cleaning unit. Thus, for example, a first set of solenoids can respectively individually control the flow of the gas to a first set of gas-based cleaning units; while a second set of solenoids can respectively individually control the flow of the liquid to a second set of liquid-based cleaning units. The one or more controllers can individually control each solenoid to control the respective flow of gas or liquid to the corresponding sensor cleaning unit, thereby enabling individualized cleaning of a sensor.

Individualized cleaning of sensors improves the efficiency of the sensor cleaning system. For example, the sensor cleaning system can clean only particular sensors that have been identified as requiring cleaning, rather than cleaning all sensors periodically regardless of contamination status. As another example, the sensor cleaning system can clean front-facing sensors more often than rear-facing sensors, since front-facing sensors typically experience increased accumulation of dirt, dust, road salt, organic matter (e.g., "bug splatter," pollen, bird droppings, etc.), or other contaminants. Cleaning individual sensors only when required saves energy and fluid resources and reduces usage and "wear and tear" on the sensor cleaning units.

Individualized cleaning of sensors also improves the performance of the corresponding sensors. For example, individualized cleaning of sensors eliminates instances in which the all of the sensors are simultaneously cleaned, thereby eliminating instances in which the entire sensor system is temporarily "blinded." Eliminating such instances of blinding results in better overall sensor data quality. In addition, individualized cleaning of sensors allows for the cleaning of a particular sensor as soon it is recognized that a sensor requires cleaning. Such is in contrast to periodic sensor cleaning techniques where a sensor that requires cleaning may remain contaminated until the next scheduled sensor cleaning or until the next instance in which all sensors can safely be simultaneously cleaned.

According to another aspect, in some implementations, two or more the plurality of flow control devices (e.g., solenoids) for a given cleaning system (e.g., gas or liquid) can be included in a manifold (e.g., a solenoid manifold) or other combined structure. As one example, in some implementations, all of the solenoids that serve to control the flow of gas from the tank to the gas-based sensor cleaning units associated with the cameras and/or LIDAR sensors of the autonomous vehicle can be included in a first solenoid manifold; while all of the solenoids that serve to control the flow of liquid to the liquid-based sensor cleaning units associated with the cameras and/or LIDAR sensors of the autonomous vehicle can be included in a second solenoid manifold. In some implementations, a third and/or a fourth solenoid manifold can control the flow of the gas and/or liquid to the RADAR sensors, respectively. Other divisions of manifolds and sensors can be used as well.

In some implementations, one or more of the flow control device manifolds (e.g., solenoid manifolds) can be integrated with the corresponding fluid tank. As one example, a solenoid manifold that controls the respective flow of the gas to the gas-based sensor cleaning units can be physically located within a pressurized volume of the gas stored by a gas tank. Likewise, a solenoid manifold that controls the respective flow of the liquid to the liquid-based sensor cleaning units can be physically located within a pressurized volume of the liquid stored by a liquid tank.

Inclusion of the flow control device manifold(s) within the corresponding tank(s) enables such components to be provided as a single package, thereby saving space. Inclusion of the flow control device manifold(s) within the corresponding tank(s) also decreases the respective fluid flow distances from the tank to the sensor cleaning units, thereby eliminating pressure loss due to hose length and, conversely, increasing pressure of the fluid when used by the sensor cleaning unit(s).

In addition, in some implementations, the integrated fluid tank can further include valves, a humidity sensor, a pressure sensor, and/or controls coupled thereto or otherwise integrated therewith. For example, in some implementations, the one or more controllers can be physically located on or otherwise include a control board that is integrated with a fluid tank. For example, the control board can be physically coupled to the integrated flow control device manifold.

In addition, in some implementations, the one or more controllers can determine when a particular sensor of the plurality of sensors requires cleaning. Thus, in some implementations, in addition to controlling the flow control devices, the one or more controllers can actively (e.g., periodically, continuously, or near-continuously) assess a respective contamination status of each sensor and determine, based on such contamination status, when a particular sensor requires cleaning. In response to a determination that a particular sensor requires cleaning, the one or more controllers can control a particular flow control device that corresponds to such particular sensor to allow the flow of the fluid to the corresponding sensor cleaning unit to enable the corresponding sensor cleaning unit to individually clean the particular sensor.

According to another aspect of the present disclosure, in some implementations, the sensor cleaning system can determine whether each sensor requires cleaning based at least in part on the respective sensor data collected by each sensor. In particular, each sensor can collect sensor data that describes the surrounding environment or other aspects of the autonomous vehicle. The one or more controllers (either alone or in combination with other components or systems of the autonomous vehicle) can analyze the collected sensor data to assess the respective contamination status of each sensor. Thus, a feedback control loop can use the data collected by a particular sensor to determine the contamination status of such sensor.

As one example, the plurality of sensors can include at least one camera that collects imagery and the sensor cleaning system can determine that the camera requires cleaning based at least in part on one or more characteristics of the imagery captured by the camera. As examples, the one or more controllers (either alone or in combination with other components or systems of the autonomous vehicle) can determine that the camera requires cleaning based at least in part on at least one of a sharpness and a brightness of at least a portion of a frame included in imagery captured by the camera. For example, if the sharpness, brightness, and/or other characteristic(s) fall below respective threshold value(s), then it can be determined that the camera requires cleaning. As another example, if the sharpness, brightness, and/or other characteristic(s) decline or otherwise worsen over a number of frames or over time, then it can be determined that the camera requires cleaning. As yet another example, if the sharpness, brightness, and/or other characteristic(s) of a first portion of a frame of imagery captured by the camera are significantly worse than the sharpness, brightness, and/or other characteristic(s) of a second portion of the same frame of imagery, then it can be determined that the camera requires cleaning.

In yet another example, the one or more controllers (either alone or in combination with other components or systems of the autonomous vehicle) can detect an occlusion exhibited at a same location in a plurality of frames captured by a camera. For example, a patch of dirt might have accumulated on the camera lens, thereby occluding the camera's field of view over a number of frames of imagery. In response, the one or more controllers can determine that the camera requires cleaning and control the cleaning system to enable cleaning of the camera with a gas and/or a liquid.

As another example, in some implementations, to determine that one or more sensors require cleaning, the one or more controllers (either alone or in combination with other components or systems of the autonomous vehicle) can detect a disappearance of an observed object. As an example, if the autonomous vehicle continuously observes a pedestrian over a period of sensor data collection and processing iterations, and then suddenly the pedestrian is no longer observed based on the sensor data, it can be assumed that one or more of the sensors that collected the corresponding sensor data require cleaning. For example, a splash from a mud puddle can have obscured a camera lens, thereby causing the pedestrian to disappear from the sensor data collected by the corresponding camera.

As another example, to determine that one or more sensors require cleaning, the one or more controllers (either alone or in combination with other components or systems of the autonomous vehicle) can detect an absence of an object that is expected to be observed. As an example, an autonomous vehicle can be located at a known location at which the autonomous vehicle would expect, for example based on map data, to observe a stoplight. However, if the autonomous vehicle does not observe the stoplight at the expected location, then it can be assumed that one or more of the sensors that would be expected to collect sensor data indicative of the expected object require cleaning. For example, an accumulation of dirt may cause a camera to have an obscured field of view and, therefore, fail to observe the stoplight.

Thus, in some implementations, the sensor cleaning system can cooperatively operate with various components of the autonomous vehicle (e.g., a perception system of the autonomous vehicle) to perform sensor contamination status detection based on the presence and/or absence of environmental objects observed by the autonomous vehicle in furtherance of its autonomous driving.

In some implementations, an entirety of the sensor cleaning system exclusive of wiring is physically located external to a cab of the autonomous vehicle. As one example, for a gas cleaning system, the compressor can be located on a platform underneath the vehicle while all other components, including tank and sensor cleaning units are located on a roof of the vehicle (e.g., in a pod mounted on the roof of the vehicle). As another example, the compressor and the tank can be located in the trunk of the vehicle. As another example, for a liquid cleaning system, all system components except for the liquid reservoir and/or the pump can be located on the roof of the vehicle (e.g., in the pod mounted on the roof of the vehicle). For example, the liquid reservoir and/or the pump can be located under a hood of the vehicle. In addition, in some implementations, the entirety of the sensor cleaning system inclusive of wiring is physically located external to the cab of the autonomous vehicle.

In some implementations, the sensor cleaning system can further include a controller area network. For example, the one or more controllers can transmit control signals on the controller area network to control the plurality of flow control devices. Use of a controller area network by the sensor cleaning system contrasts with the more typical use of a local interconnect network in vehicular applications. Use of a controller area network enables use a message broadcast and renders the sensor cleaning system infinitely scalable from a communications perspective.

As one example, in some implementations, at least two or more of the flow control devices can be integrated into a fluid tank, as described above. The integrated tank can include a number of connection pins that receive control signals from the controller area network. In some implementations, the control signals that control the flow control devices can include a sequence signal and a firing order signal that instruct the integrated tank how to control the corresponding flow control devices. In one example, the integrated tank can have four connection pins that respectively correspond to power, ground, sequence, and firing order.

According to another aspect of the present disclosure, the sensor cleaning system can include a liquid cleaning system that is gas-pressurized. Use of the gas cleaning system to pressurize the liquid cleaning system enables the use of liquids at much higher pressures than can be achieved by alternative liquid cleaning systems that rely upon, for example, a pump to provide the flow of liquid to the liquid cleaning units. Higher pressure liquids enable improved cleaning through better contaminant removal.

In particular, in some implementations, the sensor cleaning system can include a pressure transfer device that uses a first volume of a gas to pressurize the liquid used by the liquid cleaning system. For example, in some implementations, the pressure transfer device can include a first chamber that holds the first volume of gas; a second chamber that holds a second volume of the liquid; and a partition physically located between the first chamber and the second chamber. The second chamber can be fluidly connected to a liquid tank. The partition can be at least one of deformable and movable in response to a difference in respective pressures associated with the first and the second chambers. Thus, the partition can move, deform, or otherwise adjust to equalize the respective pressures between the first and the second chambers (e.g., eliminate the difference in respective pressures associated with the first and the second chambers).

As one example, the partition can be a piston that moves in response to the difference in the respective pressures associated with the first and the second chambers. As another example, the partition can be a membrane that deforms in response to the difference in the respective pressures associated with the first and the second chambers.

In some implementations, the pressure transfer device can further include a biasing element that biases the partition toward increasing the second volume of the liquid. For example, the second chamber can draw from the liquid reservoir (e.g., a windshield washer reservoir). As examples, the biasing element can be a mechanical spring, a resilient member, or other mechanical component configured to bias the partition toward increasing the second volume of the liquid. As another example, the biasing element can include one or more magnets (e.g., electromagnets) that bias the partition toward increasing the second volume of the liquid. As yet another example, in some implementations, the pressure transfer device does not include the biasing element but instead uses gravitational forces to bias the partition toward increasing the second volume of the liquid.

In some implementations, the pressure transfer device can further include one or more gas flow control devices that control the flow of the gas into and out of the first chamber. The one or more gas flow control devices can be controlled (e.g., by the one or more controllers) to obtain a desired pressure in the second chamber that holds the liquid. For example, the gas flow control devices can be controlled to permit inflow of the gas into the first chamber while denying outflow of the gas from the first chamber until a desired pressure is reached. The partition can apply the pressure from the gas in the first chamber to pressurize the liquid in the second chamber. When additional liquid is desired in the second chamber, the gas flow control devices can be controlled to deny inflow of the gas into the first chamber while permitting outflow of the gas from the first chamber until a lower pressure is reached in the first chamber. The partition can then move or deform to draw liquid into the second chamber, according to its bias.

In some implementations, the liquid sensor cleaning system can further include one or more liquid pressure sensors positioned to provide sensor readings of the liquid pressure in the pressurized volume of the liquid. For example, the liquid pressure sensor(s) can be positioned within the second chamber. The gas flow control devices can be controlled based on the sensor readings provided by the liquid pressure sensor(s) (e.g., as described above to achieve a desired pressure in the second chamber).

Thus, the present disclosure provides an advanced sensor cleaning system suitable for meeting the unique sensor cleaning requirements of an autonomous vehicle. In particular, sensor cleaning system can feature individualized cleaning of sensors included in an autonomous vehicle and/or feature a liquid sensor cleaning system that is gas-pressurized.

With reference now to the Figures, example embodiments of the present disclosure will be discussed in further detail.

Example Devices and Systems

FIG. 1 depicts a block diagram of an example autonomous vehicle 10 according to example embodiments of the present disclosure. The autonomous vehicle 10 is capable of sensing its environment and navigating with little to no human input. The autonomous vehicle 10 can be a ground-based autonomous vehicle (e.g., car, truck, bus, etc.), an air-based autonomous vehicle (e.g., airplane, drone, helicopter, or other aircraft), or other types of vehicles (e.g., watercraft).

The autonomous vehicle 10 includes one or more sensors 101, a sensor cleaning system 150, a vehicle computing system 102, and one or more vehicle controls 107. The vehicle computing system 102 can assist in controlling the autonomous vehicle 10. In particular, the vehicle computing system 102 can receive sensor data from the one or more sensors 101, attempt to comprehend the surrounding environment by performing various processing techniques on data collected by the sensors 101, and generate an appropriate motion path through such surrounding environment. The vehicle computing system 102 can control the one or more vehicle controls 107 to operate the autonomous vehicle 10 according to the motion path.

The vehicle computing system 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause vehicle computing system 102 to perform operations.

As illustrated in FIG. 1, the vehicle computing system 102 can include a perception system 103, a prediction system 104, and a motion planning system 105 that cooperate to perceive the surrounding environment of the autonomous vehicle 10 and determine a motion plan for controlling the motion of the autonomous vehicle 10 accordingly.

In particular, in some implementations, the perception system 103 can receive sensor data from the one or more sensors 101 that are coupled to or otherwise included within the autonomous vehicle 10. As examples, the one or more sensors 101 can include a Light Detection and Ranging (LIDAR) system, a Radio Detection and Ranging (RADAR) system, one or more cameras (e.g., visible spectrum cameras, infrared cameras, etc.), and/or other sensors. The sensor data can include information that describes the location of objects within the surrounding environment of the autonomous vehicle 10.

As one example, for a LIDAR system, the sensor data can include the location (e.g., in three-dimensional space relative to the LIDAR system) of a number of points that correspond to objects that have reflected a ranging laser. For example, a LIDAR system can measure distances by measuring the Time of Flight (TOF) that it takes a short laser pulse to travel from the sensor to an object and back, calculating the distance from the known speed of light.

As another example, for a RADAR system, the sensor data can include the location (e.g., in three-dimensional space relative to the RADAR system) of a number of points that correspond to objects that have reflected a ranging radio wave. For example, radio waves (e.g., pulsed or continuous) transmitted by the RADAR system can reflect off an object and return to a receiver of the RADAR system, giving information about the object's location and speed. Thus, a RADAR system can provide useful information about the current speed of an object.

As yet another example, for one or more cameras, various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in imagery captured by the one or more cameras. Other sensor systems can identify the location of points that correspond to objects as well.

As another example, the one or more sensors 101 can include a positioning system. The positioning system can determine a current position of the vehicle 10. The positioning system can be any device or circuitry for analyzing the position of the vehicle 10. For example, the positioning system can determine position by using one or more of inertial sensors, a satellite positioning system, based on IP address, by using triangulation and/or proximity to network access points or other network components (e.g., cellular towers, WiFi access points, etc.) and/or other suitable techniques. The position of the vehicle 10 can be used by various systems of the vehicle computing system 102.

Thus, the one or more sensors 101 can be used to collect sensor data that includes information that describes the location (e.g., in three-dimensional space relative to the autonomous vehicle 10) of points that correspond to objects within the surrounding environment of the autonomous vehicle 10. In some implementations, the sensors 101 can be located at various different locations on the autonomous vehicle 10. As an example, in some implementations, one or more cameras and/or LIDAR sensors can be located in a pod or other structure that is mounted on a roof of the autonomous vehicle 10 while one or more RADAR sensors can be located in or behind the front and/or rear bumper(s) or body panel(s) of the autonomous vehicle 10. As another example, camera(s) can be located at the front or rear bumper(s) of the vehicle 10 as well. Other locations can be used as well.

In addition to the sensor data, the perception system 103 can retrieve or otherwise obtain map data 126 that provides detailed information about the surrounding environment of the autonomous vehicle 10. The map data 126 can provide information regarding: the identity and location of different travelways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travelway); traffic control data (e.g., the location and instructions of signage, traffic lights, or other traffic control devices); and/or any other map data that provides information that assists the computing system 102 in comprehending and perceiving its surrounding environment and its relationship thereto.

The perception system 103 can identify one or more objects that are proximate to the autonomous vehicle 10 based on sensor data received from the one or more sensors 101 and/or the map data 126. In particular, in some implementations, the perception system 103 can determine, for each object, state data that describes a current state of such object. As examples, the state data for each object can describe an estimate of the object's: current location (also referred to as position); current speed (also referred to as velocity); current acceleration; current heading; current orientation; size/footprint (e.g., as represented by a bounding shape such as a bounding polygon or polyhedron); class (e.g., vehicle versus pedestrian versus bicycle versus other); yaw rate; and/or other state information.

In some implementations, the perception system 103 can determine state data for each object over a number of iterations. In particular, the perception system 103 can update the state data for each object at each iteration. Thus, the perception system 103 can detect and track objects (e.g., vehicles) that are proximate to the autonomous vehicle 10 over time.

The prediction system 104 can receive the state data from the perception system 103 and predict one or more future locations for each object based on such state data. For example, the prediction system 104 can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system 105 can determine a motion plan for the autonomous vehicle 10 based at least in part on the predicted one or more future locations for the object and/or the state data for the object provided by the perception system 103. Stated differently, given information about the current locations of objects and/or predicted future locations of proximate objects, the motion planning system 105 can determine a motion plan for the autonomous vehicle 10 that best navigates the autonomous vehicle 10 relative to the objects at such locations.

In particular, according to an aspect of the present disclosure, the motion planning system 105 can evaluate one or more cost functions and/or one or more reward functions for each of one or more candidate motion plans for the autonomous vehicle 10. For example, the cost function(s) can describe a cost (e.g., over time) of adhering to a particular candidate motion plan while the reward function(s) can describe a reward for adhering to the particular candidate motion plan. For example, the reward can be of opposite sign to the cost.

Thus, given information about the current locations and/or predicted future locations of objects, the motion planning system 105 can determine a total cost (e.g., a sum of the cost(s) and/or reward(s) provided by the cost function(s) and/or reward function(s)) of adhering to a particular candidate pathway. The motion planning system 105 can select or determine a motion plan for the autonomous vehicle 10 based at least in part on the cost function(s) and the reward function(s). For example, the motion plan that minimizes the total cost can be selected or otherwise determined. The motion planning system 105 can provide the selected motion plan to a vehicle controller 106 that controls one or more vehicle controls 107 (e.g., actuators or other devices that control gas flow, steering, braking, etc.) to execute the selected motion plan.

According to an aspect of the present disclosure, the autonomous vehicle 10 can further include the sensor cleaning system 150. In particular, in some implementations, the sensor cleaning system 150 can include a plurality of sensor cleaning units that are configured to respectively clean a plurality of sensors 101 of the autonomous vehicle 10 using a fluid (e.g., a gas or a liquid). Thus, the sensor cleaning system 150 can include a gas cleaning system that cleans the sensors 101 using a gas (e.g., compressed air); a liquid cleaning system that cleans the sensors 101 using a liquid (e.g., windshield washer fluid); or both the gas cleaning system and the liquid cleaning system.

According to one aspect of the present disclosure, in some implementations, the sensor cleaning system 150 can provide individualized cleaning of the sensors 101 of the autonomous vehicle 10. For example, one or more controllers of the sensor cleaning system 150 can individually control the flow of a corresponding fluid to each sensor cleaning unit to enable individualized cleaning of the sensors 101. In addition, in some implementations, the one or more controllers can determine whether each sensor 101 requires cleaning based at least in part on the respective sensor data collected by each sensor 101. In some instances, the sensor cleaning system 150 can determine whether each sensor 101 requires cleaning based at least in part on data (e.g., object state data) and/or other information received from the vehicle computing system 102 (e.g., from the perception system 103). The individualized cleaning of sensors 101 improves the efficiency of the cleaning system 150 and eliminates instances in which all of the sensors 101 are simultaneously cleaned, thereby eliminating instances in which the entire sensor system is temporarily "blinded."

According to another aspect of the present disclosure, in some implementations, the sensor cleaning system 150 can include both a gas cleaning system and a liquid cleaning system. As an example, in some implementations, a particular sensor 101 can have associated therewith (e.g., physically coupled and/or adjacent thereto) a gas cleaning unit configured to use a gas to clean such sensor and/or a liquid cleaning unit configured to use a liquid to clean such sensor.

As such, according to yet another aspect of the present disclosure, in some implementations, the liquid cleaning system can be pressurized or otherwise powered by the gas cleaning system or other gas system. In particular, in some implementations, the sensor cleaning system 150 can include a pressure transfer device that uses a first volume of a gas to pressurize the liquid used by the liquid cleaning system. Use of the gas cleaning system to pressurize the liquid cleaning system enables the use of liquids at much higher pressures than can be achieved by alternative liquid cleaning systems that rely upon, for example, a pump to provide the flow of liquid to the liquid cleaning units.

Each of the perception system 103, the prediction system 104, the motion planning system 105, and the vehicle controller 106 can include computer logic utilized to provide desired functionality. In some implementations, each of the perception system 103, the prediction system 104, the motion planning system 105, and the vehicle controller 106 can be implemented in hardware, firmware, and/or software controlling a general purpose processor. For example, in some implementations, each of the perception system 103, the prediction system 104, the motion planning system 105, and the vehicle controller 106 includes program files stored on a storage device, loaded into a memory and executed by one or more processors. In other implementations, each of the perception system 103, the prediction system 104, the motion planning system 105, and the vehicle controller 106 includes one or more sets of computer-executable instructions that are stored in a tangible computer-readable storage medium such as RAM hard disk or optical or magnetic media.

Figure 2:
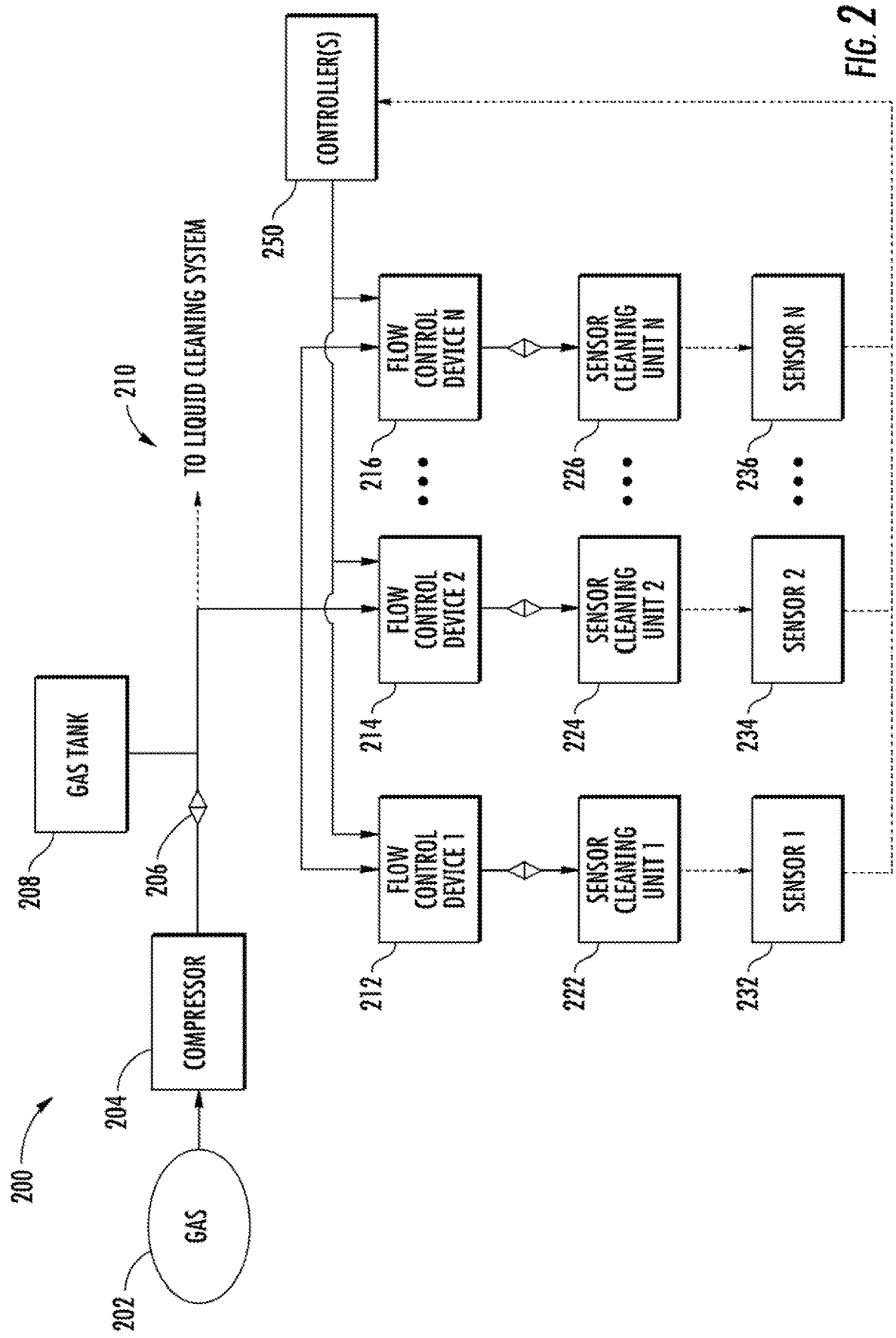
FIG. 2 depicts a block diagram of an example gas-based sensor cleaning system according to example embodiments of the present disclosure.

FIG. 2 depicts a block diagram of an example gas-based sensor cleaning system 200 according to example embodiments of the present disclosure. The gas-based sensor cleaning system 200 can optionally be included in the sensor cleaning system 150 of FIG. 1.

The gas-based sensor cleaning system 200 of FIG. 2 includes a compressor 204. The compressor 204 can compress a gas 202. For example, the gas 202 can be ambient air external to the autonomous vehicle. In some implementations, the compressor 204 can be mounted on a platform that is underneath the autonomous vehicle carriage. For example, the platform can be physically coupled to the autonomous vehicle chassis.

Pressurized gas from the compressor 204 can pass through a valve 206 (e.g., a one-way check valve) and can be stored in a gas tank 208. For example, the gas tank 208 can be a gas accumulator. In some implementations, the pressurized gas can also optionally be routed to assist in gas-pressurizing a liquid cleaning system, as shown at 210.

The gas-based sensor cleaning system 200 can also include a plurality of sensor cleaning units, as shown at 222, 224, and 226. Although three sensor cleaning units 222-226 are shown, any number of units can be included in the system 200. Each sensor cleaning unit 222-226 can use the pressurized gas to clean a respective sensor, as shown at 232, 234, and 236. For example, each sensor cleaning unit 222-226 can blow or otherwise release the gas onto the sensor (e.g., a lens, cover, housing, or other portion of the sensor) to remove contaminants or other debris from the sensor (e.g., from the lens, cover, housing, or other portion of the sensor).

In some implementations, one or more of the sensor cleaning units 222-226 can be an air knife that uses a "knife" of air to clean the corresponding sensor 236. For example, each air knife can include a narrow slit though which the pressurized gas is forced. In one example, the pressurized gas can travel through the narrow slit at a pressure of 80 PSI. In some implementations, each air knife can be integral to the corresponding sensor. In some implementations, each air knife can be positioned such that the pressurized gas is released perpendicular to the corresponding sensor and then sweeps over a face of the sensor due to fluid dynamics.

The gas-based sensor cleaning system 200 can also include a plurality of flow control devices, as shown at 212, 214, and 216. The flow control devices 212-216 can respectively control a flow of the pressured gas from the compressor 204 and/or the gas tank 208 to the plurality of sensor cleaning units 222-226.

The sensor cleaning system 200 can further include one or more controllers 250. The one or more controllers 250 can individually control each flow control device 212-216 to allow the flow of the pressurized gas to the corresponding sensor cleaning unit 222-226 to enable the corresponding sensor cleaning unit 222-226 to individually clean the corresponding sensor 232-236. In some implementations, the one or more controllers 250 can also control the compressor 204.

The one or more controllers 250 can include one or more control devices, units, or components that interface with or otherwise control the one or more flow control devices 212-216. As examples, a controller 250 can include one or more chips (e.g., ASICs or FPGAs), expansion cards, and/or electronic circuitry (e.g., amplifiers, transistors, capacitors, etc.) that are organized or other configured to control one or more flow control devices (e.g., by way of control signals). In some implementations, a controller 250 can include a processor that loads and executes instructions stored in a computer-readable media to perform operations.

In some implementations, the one or more controllers 250 include a single controller. In some implementations, the one or more controllers 250 include a plurality of controllers that respectively control the plurality of flow control devices 212-216. In some implementations, the one or more controllers 250 can be physically located on a control board. For example, the control board can be physically coupled to a flow control device manifold, as described below.

In some implementations, the plurality of flow control devices 212-216 can include a plurality of solenoids that are individually controllable by the one or more controllers 250 to respectively allow or disallow the flow of the pressurized gas to the corresponding sensor cleaning unit 222-226. That is, the one or more controllers 250 can individually control each solenoid to control the respective flow of gas to the corresponding sensor cleaning unit 222-226, thereby enabling individualized cleaning of each sensor 232-236.

Individualized cleaning of sensors improves the efficiency of the sensor cleaning system 200. For example, the sensor cleaning system 200 can clean only particular sensors 232-236 that have been identified as requiring cleaning, rather than cleaning all sensors 232-236 periodically regardless of contamination status. As another example, the sensor cleaning system 200 can clean front-facing sensors more often than rear-facing sensors, since front-facing sensors typically experience increased accumulation of dirt, dust, road salt, organic matter (e.g., "bug splatter," pollen, bird droppings, etc.), or other contaminants. Cleaning individual sensors only when required saves energy and gas resources and reduces usage and "wear and tear" on the sensor cleaning units 222-226. For example, the net amount of pressurized gas used by the system 200 can be decreased.

Individualized cleaning of sensors also improves the performance of the corresponding sensors 232-236. For example, individualized cleaning of sensors eliminates instances in which the all of the sensors 232-236 are simultaneously cleaned, thereby eliminating instances in which the entire sensor system is temporarily "blinded." Eliminating such instances of blinding results in better overall sensor data quality. In addition, individualized cleaning of sensors allows for the cleaning of a particular sensor 232-236 as soon it is recognized that a sensor 232-236 requires cleaning. Such is in contrast to periodic sensor cleaning techniques where a sensor that requires cleaning may remain contaminated until the next scheduled sensor cleaning or until the next instance in which all sensors can safely be simultaneously cleaned.

According to another aspect, in some implementations, two or more the plurality of flow control devices 212-216 (e.g., solenoids) can be included in a manifold (e.g., a solenoid manifold) or other combined structure. In some implementations, one or more of the flow control device manifolds (e.g., solenoid manifolds) can be integrated with the gas tank 208. As an example, a solenoid manifold that controls the respective flow of the pressurized gas to the sensor cleaning units 222-226 can be physically located within a pressurized volume of the gas stored by a gas tank 208. In some implementations, the one or more controllers 250 can also be integrated with the gas tank 208. For example, the one or more controllers 250 can be physically located on a control board that is physically coupled to the flow control device manifold.

Inclusion of the flow control device manifold within the gas tank 208 enables such components to be provided as a single package, thereby saving space. Inclusion of the flow control device manifold within the gas tank 208 also decreases the respective gas flow distances from the tank 208 to the sensor cleaning units 222-226, thereby eliminating pressure loss due to hose length and, conversely, increasing pressure of the gas when used by the sensor cleaning units 222-226.

In addition, in some implementations, the integrated gas tank can further include valves, a humidity sensor, a pressure sensor, and/or controls coupled thereto or otherwise integrated therewith.

In addition, in some implementations, the one or more controllers 250 can determine when a particular sensor of the plurality of sensors 232-236 requires cleaning. Thus, in some implementations, in addition to controlling the flow control devices 212-216, the one or more controllers 250 can actively (e.g., periodically, continuously, or near-continuously) assess a respective contamination status of each sensor 232-236 and determine, based on such contamination status, when a particular sensor 232-236 requires cleaning. In response to a determination that a particular sensor 232-236 requires cleaning, the one or more controllers 250 can control a particular flow control device 212-216 that corresponds to such particular sensor 232-236 to allow the flow of the pressurized gas to the corresponding sensor cleaning unit 222-226 to enable the corresponding sensor cleaning unit 222-226 to individually clean the particular sensor 232-236.

According to another aspect of the present disclosure, in some implementations, the sensor cleaning system 200 can determine whether each sensor 232-236 requires cleaning based at least in part on the respective sensor data collected by each sensor 232-236. In particular, each sensor can collect sensor data that describes the surrounding environment or other aspects of the autonomous vehicle. The one or more controllers 250 (either alone or in combination with other components or systems of the autonomous vehicle) can analyze the collected sensor data to assess the respective contamination status of each sensor 232-236. Thus, a feedback control loop can use the data collected by the sensor 232-236 to determine the cleaning requirement status of the sensor 232-236.

In some implementations, the sensor cleaning system 200 can cooperatively operate with various components of the autonomous vehicle (e.g., a perception system of the autonomous vehicle) to perform sensor contamination status detection based on the presence and/or absence of environmental objects observed by the autonomous vehicle in furtherance of its autonomous driving.

In some implementations, an entirety of the sensor cleaning system 200 exclusive of wiring is physically located external to a cab of the autonomous vehicle. As one example, the compressor 204 can be located on a platform underneath the vehicle while all other components, including the tank 208, flow control devices 212-216, and sensor cleaning units 222-226 are located on a roof of the vehicle (e.g., in a pod mounted on the roof of the vehicle). As another example, the compressor 204 and/or the tank 208 can be located in the trunk of the vehicle. In addition, in some implementations, the entirety of the sensor cleaning system 200 inclusive of wiring is physically located external to the cab of the autonomous vehicle.

In some implementations, the sensor cleaning system 200 can further include a controller area network. For example, the one or more controllers 250 can transmit control signals on the controller area network to control the plurality of flow control devices 212-216. Use of a controller area network by the sensor cleaning system 200 contrasts with the more typical use of a local interconnect network in vehicular applications. Use of a controller area network enables use a message broadcast and renders the sensor cleaning system 200 infinitely scalable from a communications perspective.

As one example, in some implementations, at least two or more of the flow control devices 212-216 can be integrated into the gas tank 208, as described above. The integrated tank can include a number of connection pins that receive control signals from the controller area network. In some implementations, the control signals that control the flow control devices 212-216 can include a sequence signal and a firing order signal that instruct the integrated tank how to control the corresponding flow control devices 212-216. In one example, the integrated tank can have four connection pins that respectively correspond to power, ground, sequence, and firing order.

Figure 3:
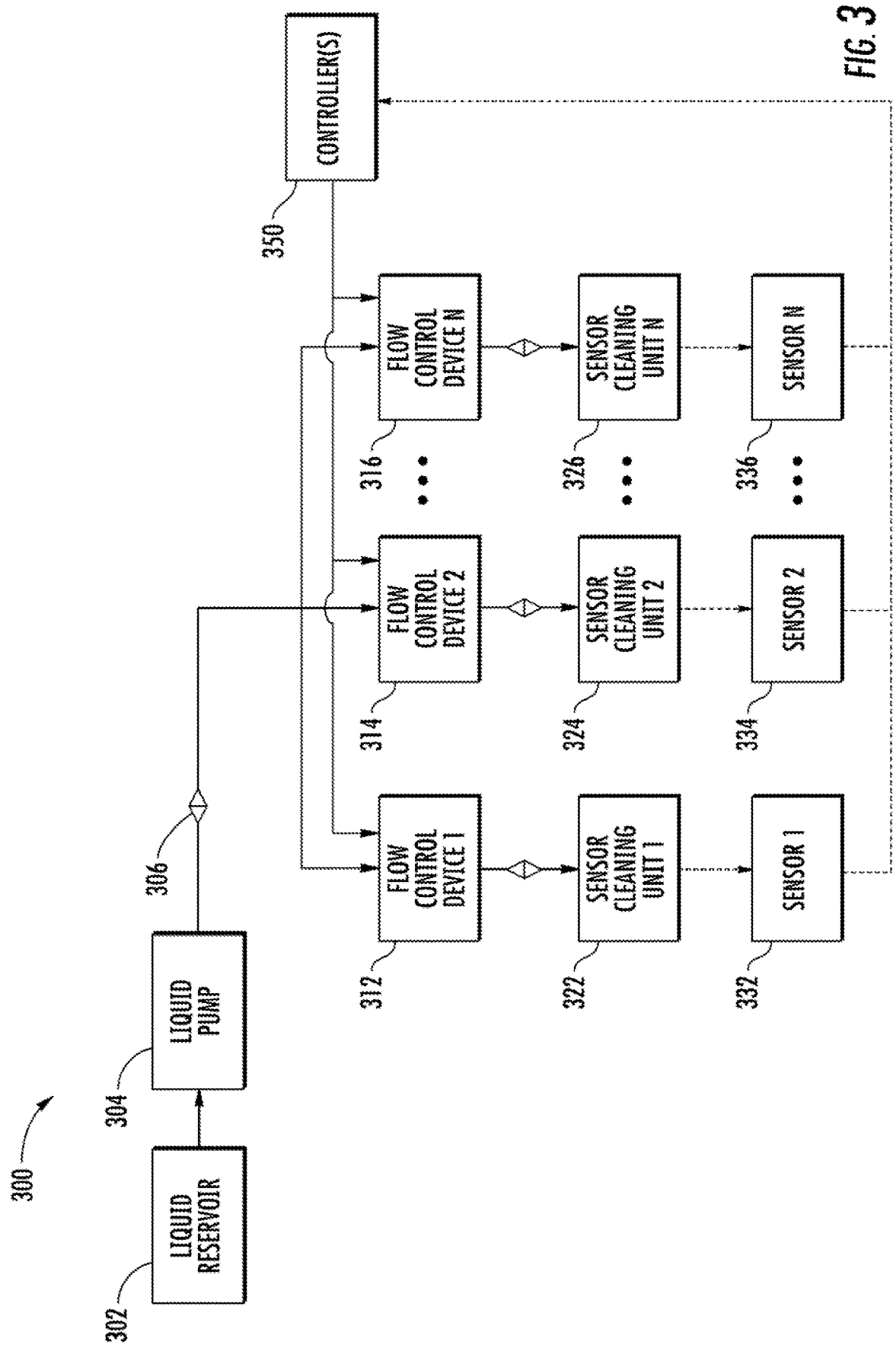
FIG. 3 depicts a block diagram of an example liquid-based sensor cleaning system according to example embodiments of the present disclosure.

FIG. 3 depicts a block diagram of an example liquid-based sensor cleaning system 300 according to example embodiments of the present disclosure. The liquid-based sensor cleaning system 300 can optionally be included in the sensor cleaning system 150 of FIG. 1.

The liquid-based sensor cleaning system 300 of FIG. 3 includes a liquid pump 304. The liquid pump 304 can pump a liquid from a liquid reservoir 302. For example, the liquid reservoir 302 can be a windshield washer reservoir of the autonomous vehicle. Liquid pumped by the pump 304 can pass through a valve 306 (e.g., a one-way check valve) to reach one or more flow control devices 312, 314, and 316.

The liquid-based sensor cleaning system 300 can also include a plurality of sensor cleaning units, as shown at 322, 324, and 326. Although three sensor cleaning units 322-326 are shown, any number of units can be included in the system 300. Each sensor cleaning unit 322-326 can use the liquid to clean a respective sensor, as shown at 332, 334, and 336. For example, each sensor cleaning unit 322-326 can spray or otherwise release the liquid onto the sensor (e.g., a lens, cover, housing, or other portion of the sensor) to remove contaminants or other debris from the sensor (e.g., from the lens, cover, housing, or other portion of the sensor). In some implementations, one or more of the sensor cleaning units 322-326 can include a nozzle that sprays the liquid onto the sensor 332-336 to clean the sensor 332-336. In some implementations, each sensor cleaning unit 322-326 can be integral to the corresponding sensor 332-336.

The liquid-based sensor cleaning system 300 can also include the plurality of flow control devices, as shown at 312, 314, and 316. The flow control devices 312-316 can respectively control a flow of the liquid from the liquid pump 304 to the plurality of sensor cleaning units 322-326.

The sensor cleaning system 300 can further include one or more controllers 350. The one or more controllers 350 can individually control each flow control device 312-316 to allow the flow of the liquid to the corresponding sensor cleaning unit 322-326 to enable the corresponding sensor cleaning unit 322-326 to individually clean the corresponding sensor 332-336. In some implementations, the one or more controllers 350 can also control the liquid pump 304.

The one or more controllers 350 can include one or more control devices, units, or components that interface with or otherwise control the one or more flow control devices 312-316. As examples, a controller 350 can include one or more chips (e.g., ASIC or FPGA), expansion cards, and/or electronic circuitry (e.g., amplifiers, transistors, capacitors, etc.) that are organized or other configured to control one or more flow control devices (e.g., by way of control signals). In some implementations, a controller 350 can include a processor that loads and executes instructions stored in a computer-readable media to perform operations.

In some implementations, the one or more controllers 350 include a single controller. In some implementations, the one or more controllers 350 include a plurality of controllers that respectively control the plurality of flow control devices 312-316. In some implementations, the one or more controllers 350 can be physically located on a control board. For example, the control board can be physically coupled to a flow control device manifold, as described below.

In some implementations, the plurality of flow control devices 312-316 can include a plurality of solenoids that are individually controllable by the one or more controllers 350 to respectively allow or disallow the flow of the pressurized liquid to the corresponding sensor cleaning unit 322-326. That is, the one or more controllers 350 can individually control each solenoid to control the respective flow of liquid to the corresponding sensor cleaning unit 322-326, thereby enabling individualized cleaning of each sensor 332-336.

Individualized cleaning of sensors improves the efficiency of the sensor cleaning system 300. For example, the sensor cleaning system 300 can clean only particular sensors 332-336 that have been identified as requiring cleaning, rather than cleaning all sensors 332-336 periodically regardless of contamination status. As another example, the sensor cleaning system 300 can clean front-facing sensors more often than rear-facing sensors, since front-facing sensors typically experience increased accumulation of dirt, dust, road salt, organic matter (e.g., "bug splatter," pollen, bird droppings, etc.), or other contaminants. Cleaning individual sensors only when required saves energy and liquid resources and reduces usage and "wear and tear" on the sensor cleaning units 322-326. For example, the net amount of liquid used by the system 300 can be decreased.

Individualized cleaning of sensors also improves the performance of the corresponding sensors 332-336. For example, individualized cleaning of sensors eliminates instances in which the all of the sensors 332-336 are simultaneously cleaned, thereby eliminating instances in which the entire sensor system is temporarily "blinded." Eliminating such instances of blinding results in better overall sensor data quality. In addition, individualized cleaning of sensors allows for the cleaning of a particular sensor 332-336 as soon it is recognized that a sensor 332-336 requires cleaning. Such is in contrast to periodic sensor cleaning techniques where a sensor that requires cleaning may remain contaminated until the next scheduled sensor cleaning or until the next instance in which all sensors can safely be simultaneously cleaned.

According to another aspect, in some implementations, two or more the plurality of flow control devices 312-316 (e.g., solenoids) can be included in a manifold (e.g., a solenoid manifold) or other combined structure.

In addition, in some implementations, the one or more controllers 350 can determine when a particular sensor of the plurality of sensors 332-336 requires cleaning. Thus, in some implementations, in addition to controlling the flow control devices 312-316, the one or more controllers 350 can actively (e.g., periodically, continuously, or near-continuously) assess a respective contamination status of each sensor 332-336 and determine, based on such contamination status, when a particular sensor 332-336 requires cleaning. In response to a determination that a particular sensor 332-336 requires cleaning, the one or more controllers 350 can control a particular flow control device 312-316 that corresponds to such particular sensor 332-336 to allow the flow of the liquid to the corresponding sensor cleaning unit 322-326 to enable the corresponding sensor cleaning unit 322-326 to individually clean the particular sensor 332-336.

According to another aspect of the present disclosure, in some implementations, the sensor cleaning system 300 can determine whether each sensor 332-336 requires cleaning based at least in part on the respective sensor data collected by each sensor 332-336. In particular, each sensor can collect sensor data that describes the surrounding environment or other aspects of the autonomous vehicle. The one or more controllers 350 (either alone or in combination with other components or systems of the autonomous vehicle) can analyze the collected sensor data to assess the respective contamination status of each sensor 332-336. Thus, a feedback control loop can use the data collected by the sensor 332-336 to determine the cleaning requirement status of the sensor 332-336.

In some implementations, the sensor cleaning system 300 can cooperatively operate with various components of the autonomous vehicle (e.g., a perception system of the autonomous vehicle) to perform sensor contamination status detection based on the presence and/or absence of environmental objects observed by the autonomous vehicle in furtherance of its autonomous driving.

In some implementations, an entirety of the sensor cleaning system 300 exclusive of wiring is physically located external to a cab of the autonomous vehicle. As one example, all system components except for the liquid reservoir 302 and/or the pump 304 can be located on the roof of the vehicle (e.g., in the pod mounted on the roof of the vehicle). For example, the liquid reservoir 302 and/or the pump 304 can be located under a hood of the vehicle. In addition, in some implementations, the entirety of the sensor cleaning system 300 inclusive of wiring is physically located external to the cab of the autonomous vehicle.

In some implementations, the sensor cleaning system 300 can further include a controller area network. For example, the one or more controllers 350 can transmit control signals on the controller area network to control the plurality of flow control devices 312-316. Use of a controller area network by the sensor cleaning system 300 contrasts with the more typical use of a local interconnect network in vehicular applications. Use of a controller area network enables use a message broadcast and renders the sensor cleaning system 300 infinitely scalable from a communications perspective.

Figure 4:
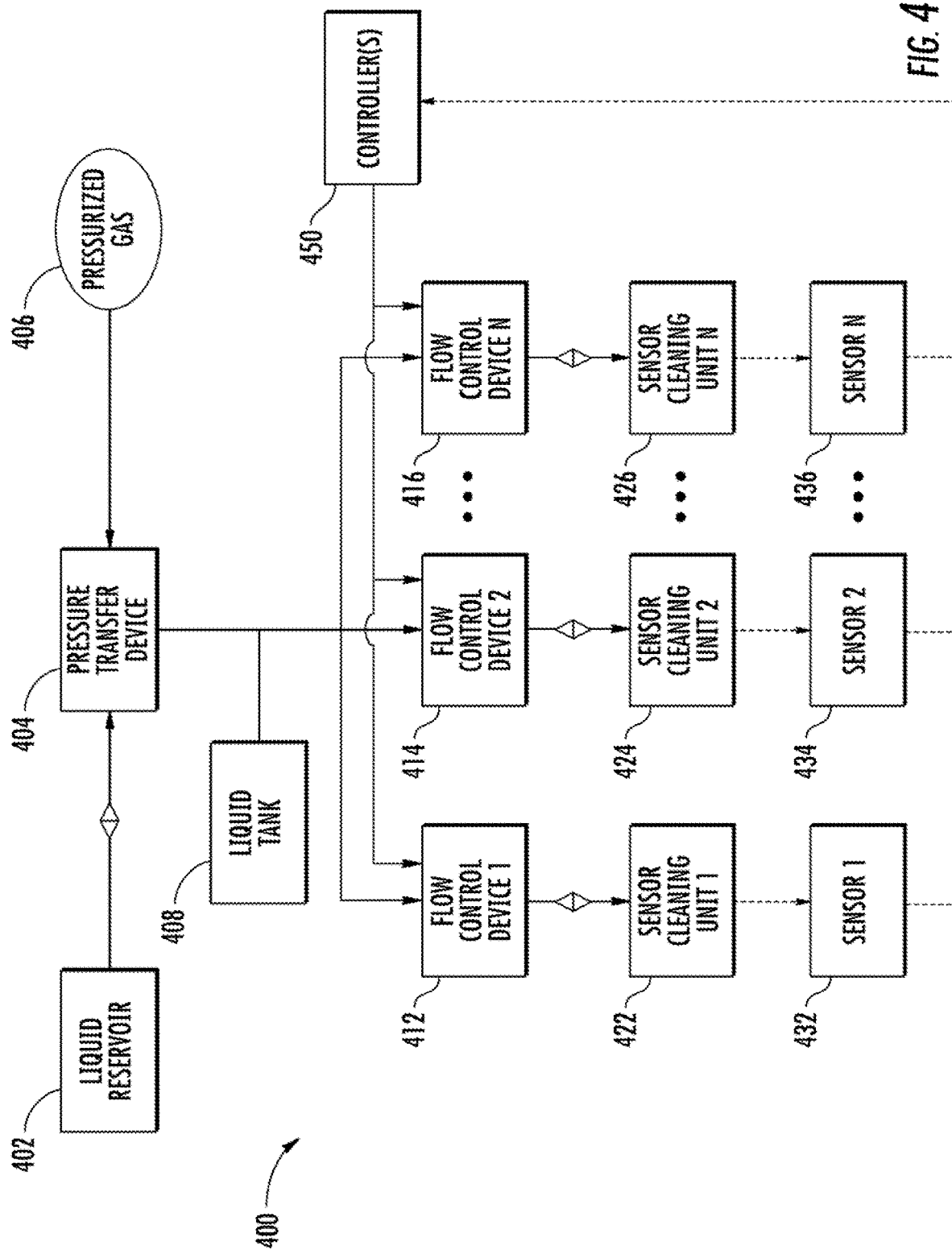
FIG. 4 depicts a block diagram of an example liquid-based sensor cleaning system according to example embodiments of the present disclosure.

FIG. 4 depicts a block diagram of an example liquid-based sensor cleaning system 400 according to example embodiments of the present disclosure. The liquid-based sensor cleaning system 400 can optionally be included in the sensor cleaning system 150 of FIG. 1.

In particular, system 400 is similar to system 300 of FIG. 4, except that liquid cleaning system 400 is gas-pressurized. Use of a gas to pressurize the liquid cleaning system 400 enables the use of liquids at much higher pressures than can be achieved by alternative liquid cleaning systems that rely upon, for example, a pump to provide the flow of liquid to the liquid cleaning units. Higher pressure liquids enable improved cleaning through better contaminant removal.

The liquid-based sensor cleaning system 400 of FIG. 4 includes a pressure transfer device 404. The pressure transfer device 404 can receive liquid from a liquid reservoir 402. For example, the liquid reservoir 402 can be a windshield washer reservoir of the autonomous vehicle.

In some implementations, the pressure transfer device 404 can pull liquid from the liquid reservoir 402. For example, the pressure transfer device 404 can include an internal mechanism that operates to draw water from the liquid reservoir 402 to the pressure transfer device. In one example, such internal mechanism includes a biasing element (e.g., a mechanical spring) that biases a partition included in the pressure transfer device 404 toward increasing a volume of a liquid chamber in the device 404, thereby pulling liquid from the reservoir 402 to the device 404. In other implementations, the system 400 can include a pump (not illustrated) that actively pumps or pushes the liquid from the liquid reservoir 402 to the pressure transfer device 404. The pump can be controlled (e.g., by the one or more controllers 450) based on knowledge of an amount of liquid included in the pressure transfer device 404 and/or the liquid tank 408. For example, various sensors or other components can be used to monitor the amount of liquid included in the pressure transfer device 404 and/or the liquid tank 408. When additional liquid is desired, the pump is operated to pump liquid from the reservoir 402 to the pressure transfer device 404. In one example, the pump can be controlled based on a position of the partition included in the pressure transfer device 404, as will be discussed in further detail with reference to FIG. 5.

Referring still to FIG. 4, the pressure transfer device 404 can use pressurized gas 406 to pressurize the liquid received from the liquid reservoir 402. Liquid pressurized by the pressure transfer device can be stored in a liquid tank 408. For example, the liquid tank 408 can be a liquid accumulator. In some implementations, the liquid tank 408 and the pressure transfer device 404 can be integrated together into a single component. The pressurized liquid provided by the pressure transfer device 404 and/or stored in the tank 408 can be respectively provided to a plurality of flow control devices 412, 414, and 416.

The liquid-based sensor cleaning system 400 can also include a plurality of sensor cleaning units, as shown at 422, 424, and 426. Although three sensor cleaning units 422-426 are shown, any number of units can be included in the system 400. Each sensor cleaning unit 422-426 can use the pressurized liquid to clean a respective sensor, as shown at 432, 434, and 436. For example, each sensor cleaning unit 422-426 can spray or otherwise release the pressurized liquid onto the sensor (e.g., a lens, cover, housing, or other portion of the sensor) to remove contaminants or other debris from the sensor (e.g., from the lens, cover, housing, or other portion of the sensor). In some implementations, one or more of the sensor cleaning units 422-426 can include a nozzle that sprays the pressurized liquid onto the sensor 432-436 to clean the sensor 432-436. In some implementations, each sensor cleaning unit 422-426 can be integral to the corresponding sensor 432-436.

The liquid-based sensor cleaning system 400 can also include the plurality of flow control devices, as shown at 412, 414, and 416. The flow control devices 412-416 can respectively control a flow of the pressurized liquid from the pressure transfer device 404 and/or the liquid tank 408 to the plurality of sensor cleaning units 422-426.

The sensor cleaning system 400 can further include one or more controllers 450. The one or more controllers 450 can individually control each flow control device 412-416 to allow the flow of the pressurized liquid to the corresponding sensor cleaning unit 422-426 to enable the corresponding sensor cleaning unit 422-426 to individually clean the corresponding sensor 432-436.

The one or more controllers 450 can include one or more control devices, units, or components that interface with or otherwise control the one or more flow control devices 412-416. As examples, a controller 450 can include one or more chips (e.g., ASIC or FPGA), expansion cards, and/or electronic circuitry (e.g., amplifiers, transistors, capacitors, etc.) that are organized or other configured to control one or more flow control devices (e.g., by way of control signals). In some implementations, a controller 450 can include a processor that loads and executes instructions stored in a computer-readable media to perform operations.

In some implementations, the one or more controllers 450 include a single controller. In some implementations, the one or more controllers 450 include a plurality of controllers that respectively control the plurality of flow control devices 412-416. In some implementations, the one or more controllers 450 can be physically located on a control board. For example, the control board can be physically coupled to a flow control device manifold, as described below.

In some implementations, the plurality of flow control devices 412-416 can include a plurality of solenoids that are individually controllable by the one or more controllers 450 to respectively allow or disallow the flow of the pressurized liquid to the corresponding sensor cleaning unit 422-426. That is, the one or more controllers 450 can individually control each solenoid to control the respective flow of liquid to the corresponding sensor cleaning unit 422-426, thereby enabling individualized cleaning of each sensor 432-436.

Individualized cleaning of sensors improves the efficiency of the sensor cleaning system 400. For example, the sensor cleaning system 400 can clean only particular sensors 432-436 that have been identified as requiring cleaning, rather than cleaning all sensors 432-436 periodically regardless of contamination status. As another example, the sensor cleaning system 400 can clean front-facing sensors more often than rear-facing sensors, since front-facing sensors typically experience increased accumulation of dirt, dust, road salt, organic matter (e.g., "bug splatter," pollen, bird droppings, etc.), or other contaminants. Cleaning individual sensors only when required saves energy and liquid resources and reduces usage and "wear and tear" on the sensor cleaning units 422-426. For example, the net amount of liquid used by the system 400 can be decreased.

Individualized cleaning of sensors also improves the performance of the corresponding sensors 432-436. For example, individualized cleaning of sensors eliminates instances in which the all of the sensors 432-436 are simultaneously cleaned, thereby eliminating instances in which the entire sensor system is temporarily "blinded." Eliminating such instances of blinding results in better overall sensor data quality. In addition, individualized cleaning of sensors allows for the cleaning of a particular sensor 432-436 as soon it is recognized that a sensor 432-436 requires cleaning. Such is in contrast to periodic sensor cleaning techniques where a sensor that requires cleaning may remain contaminated until the next scheduled sensor cleaning or until the next instance in which all sensors can safely be simultaneously cleaned.

According to another aspect, in some implementations, two or more the plurality of flow control devices 412-416 (e.g., solenoids) can be included in a manifold (e.g., a solenoid manifold) or other combined structure.

In some implementations, one or more of the flow control device manifolds (e.g., solenoid manifolds) can be integrated with the liquid tank 408. As an example, a solenoid manifold that controls the respective flow of the pressurized liquid to the sensor cleaning units 422-426 can be physically located within a pressurized volume of the liquid stored by a liquid tank 408. In some implementations, the one or more controllers 450 can also be integrated with the liquid tank 408.

Inclusion of the flow control device manifold within the liquid tank 408 enables such components to be provided as a single package, thereby saving space. Inclusion of the flow control device manifold within the liquid tank 408 also decreases the respective liquid flow distances from the tank 408 to the sensor cleaning units 422-426, thereby eliminating pressure loss due to hose length and, conversely, increasing pressure of the liquid when used by the sensor cleaning units 422-426.

In addition, in some implementations, the integrated liquid tank can further include valves, a pressure sensor, and/or controls coupled thereto or otherwise integrated therewith.

In addition, in some implementations, the one or more controllers 450 can determine when a particular sensor of the plurality of sensors 432-436 requires cleaning. Thus, in some implementations, in addition to controlling the flow control devices 412-416, the one or more controllers 450 can actively (e.g., periodically, continuously, or near-continuously) assess a respective contamination status of each sensor 432-436 and determine, based on such contamination status, when a particular sensor 432-436 requires cleaning. In response to a determination that a particular sensor 432-436 requires cleaning, the one or more controllers 450 can control a particular flow control device 412-416 that corresponds to such particular sensor 432-436 to allow the flow of the liquid to the corresponding sensor cleaning unit 422-426 to enable the corresponding sensor cleaning unit 422-426 to individually clean the particular sensor 432-436.

According to another aspect of the present disclosure, in some implementations, the sensor cleaning system 400 can determine whether each sensor 432-436 requires cleaning based at least in part on the respective sensor data collected by each sensor 432-436. In particular, each sensor can collect sensor data that describes the surrounding environment or other aspects of the autonomous vehicle. The one or more controllers 450 (either alone or in combination with other components or systems of the autonomous vehicle) can analyze the collected sensor data to assess the respective contamination status of each sensor 432-436. Thus, a feedback control loop can use the data collected by the sensor 432-436 to determine the cleaning requirement status of the sensor 432-436.

In some implementations, the sensor cleaning system 400 can cooperatively operate with various components of the autonomous vehicle (e.g., a perception system of the autonomous vehicle) to perform sensor contamination status detection based on the presence and/or absence of environmental objects observed by the autonomous vehicle in furtherance of its autonomous driving.

In some implementations, an entirety of the sensor cleaning system 400 exclusive of wiring is physically located external to a cab of the autonomous vehicle. As one example, all system components except for the liquid reservoir 402 can be located on the roof of the vehicle (e.g., in the pod mounted on the roof of the vehicle). For example, the liquid reservoir 402 can be located under a hood of the vehicle. In addition, in some implementations, the entirety of the sensor cleaning system 400 inclusive of wiring is physically located external to the cab of the autonomous vehicle.

In some implementations, the sensor cleaning system 400 can further include a controller area network. For example, the one or more controllers 450 can transmit control signals on the controller area network to control the plurality of flow control devices 412-416. Use of a controller area network by the sensor cleaning system 400 contrasts with the more typical use of a local interconnect network in vehicular applications. Use of a controller area network enables use a message broadcast and renders the sensor cleaning system 400 infinitely scalable from a communications perspective.

As one example, in some implementations, at least two or more of the flow control devices 412-416 can be integrated into the liquid tank 408, as described above. The integrated tank can include a number of connection pins that receive control signals from the controller area network. In some implementations, the control signals that control the flow control devices 412-416 can include a sequence signal and a firing order signal that instruct the integrated tank how to control the corresponding flow control devices 412-416. In one example, the integrated tank can have four connection pins that respectively correspond to power, ground, sequence, and firing order.

Figure 5:
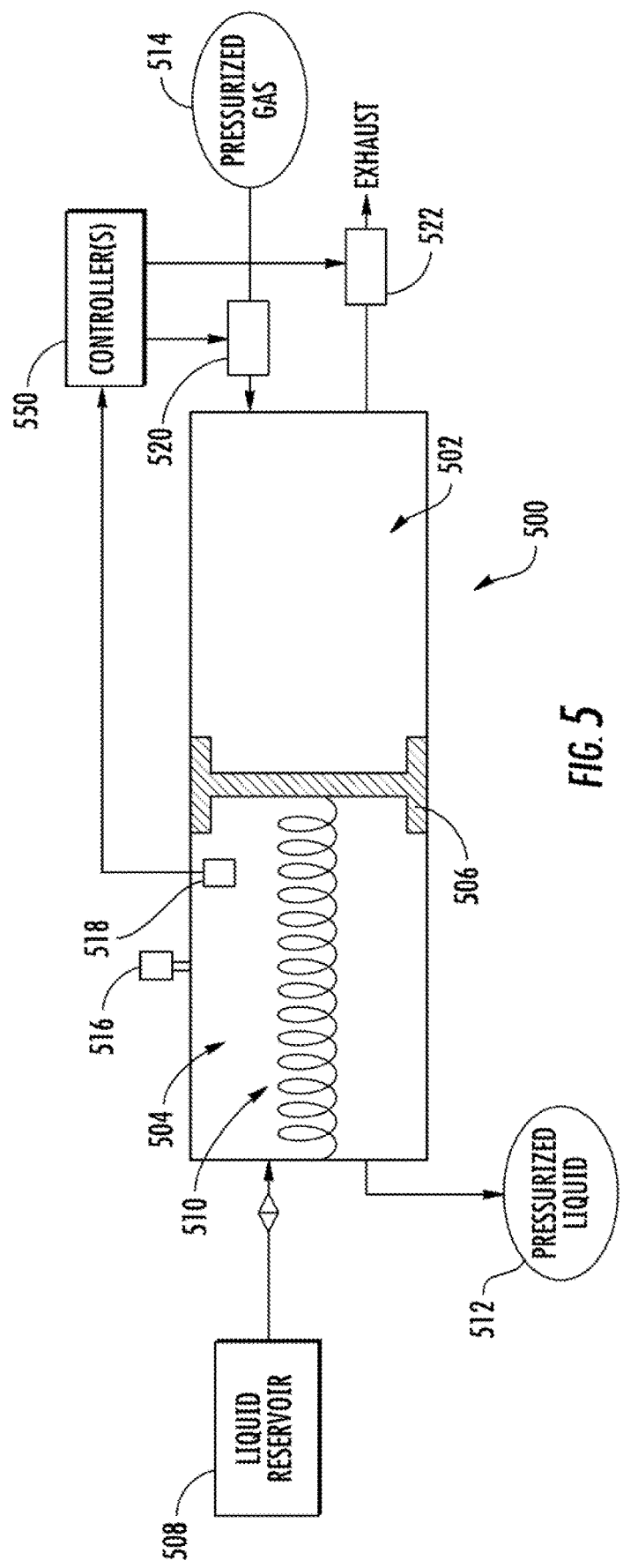
FIG. 5 depicts a schematic diagram of an example pressure transfer device according to example embodiments of the present disclosure.

FIG. 5 depicts a schematic diagram of an example pressure transfer device 500 according to example embodiments of the present disclosure. The pressure transfer device 500 can optionally be included in the liquid-based sensor cleaning system 400 of FIG. 4 and/or some other gas-pressured liquid cleaning system. The pressure transfer device 500 can use a source of pressurized gas 514 to provide a pressurized liquid 512.

In some implementations, the pressure transfer device 500 can include a first chamber 502 that holds the first volume of gas; a second chamber 504 that holds a second volume of the liquid; and a partition 506 physically located between the first chamber 502 and the second chamber 504. The second chamber 504 can be fluidly connected to a liquid tank or other components to provide the pressurized liquid 512. The partition 506 can be at least one of deformable and movable in response to a difference in respective pressures associated with the first chamber 502 and the second chamber 504. Thus, the partition 506 can move, deform, or otherwise adjust to equalize the respective pressures between the first chamber 502 and the second chamber 504 (e.g., eliminate or otherwise reduce the difference in respective pressures associated with the first and the second chambers 502 and 504).

As one example, the partition 506 can be a piston that moves in response to the difference in the respective pressures associated with the first and the second chambers 502 and 504. As another example, the partition 506 can be a membrane that deforms in response to the difference in the respective pressures associated with the first and the second chambers 502 and 504.

In some implementations, the pressure transfer device 500 can further include a biasing element that biases the partition 506 toward increasing the second volume of the liquid. For example, the second chamber 504 can draw from a liquid reservoir 508 (e.g., a windshield washer reservoir). As examples, the biasing element can be a mechanical spring (e.g., as shown at 510), a resilient member, or other mechanical component configured to bias the partition 506 toward increasing the second volume of the liquid in the second chamber 504. The mechanical spring 510 can be included in the second chamber 504 to push the partition 506 toward the first chamber, as shown, or can be included in the first chamber 502 to pull the partition 506 toward the first chamber (not shown). As another example, the biasing element can include one or more magnets that bias the partition 506 toward increasing the second volume of the liquid. As yet another example, in some implementations, the pressure transfer device 500 does not include the biasing element but instead uses gravitational forces to bias the partition 506 toward increasing the second volume of the liquid. As yet another example, in some implementations, the system can include a pump (not illustrated) that, when operated, pumps liquid from the liquid reservoir 508 to the second chamber 504. For example, the pump can be controlled by one or more controllers 550, In some implementations, the pressure transfer device 500 can further include gas flow control devices 520 and 522 that respectively control the flow of the pressurized gas 514 into and out of the first chamber 502. For example, the gas flow control devices 520 and 522 can be solenoids. The gas flow control devices 520 and 522 can be controlled by the one or more controllers 550 to obtain a desired pressure in the second chamber 504 that holds the liquid. For example, the gas flow control devices 520 and 522 can be controlled to permit inflow of the pressurized gas 514 into the first chamber 502 while denying outflow of the gas from the first chamber 502 until a desired pressure is reached in the first chamber 502 and/or the second chamber 504. The partition 506 can apply the pressure from the gas in the first chamber 502 to pressurize the liquid in the second chamber 504.

In some implementations, the position of the partition 506 can be detected and used to control aspects of the operation of the pressure transfer device 500. For example, the position of the partition 506 can be detected using various sensors. As one example, in some implementations, the partition 506 can include a magnetic portion (e.g., a magnetic ring attached to the partition 506). The magnetic portion of the partition 506 can be sensed by one or more magnetic sensors/switches (not illustrated) that are positioned along a portion of the pressure transfer device 500 (e.g., along an exterior of the portion of the device 500). The magnetic sensors/switches can sense the position of the partition 506 due to the magnetic portion. The position of the partition 506 can be used to infer the amount of liquid currently held in the second chamber 504. When additional liquid is desired in the second chamber 504, the gas flow control devices 520 and 522 can be controlled to respectively deny inflow of the gas into the first chamber 502 while permitting outflow of the gas from the first chamber 502 until a lower pressure is reached in the first chamber 502. In some implementations, the partition 506 can then move or deform (e.g., due to action of the biasing element) to draw liquid from the liquid reservoir 508 into the second chamber 504, according to the bias of the partition 506. In other implementations, a pump can be operated to pump liquid from the liquid reservoir 508 into the second chamber 504.

Thus, in implementations which include the pump, when the position of the partition 506 indicates that the volume of liquid contained in the second chamber 504 is substantially reduced, the first chamber 502 can be de-pressurized and the pump can be operated to pump liquid from the liquid reservoir 508 into the second chamber 504. As another example, in implementations that include a biasing element, when the position of the partition 506 indicates that the volume of liquid contained in the second chamber 504 is substantially reduced, the first chamber 502 can be de-pressurized to allow the biasing element to cause the partition 506 to draw liquid from the reservoir 508 into the second chamber 504.

After entry of additional liquid into chamber 504, the gas flow control devices 520 and 522 can again be controlled to enable pressurization of the liquid via entry of gas into the first chamber 502.

In some implementations, the pressure transfer device 500 can include an auto relief valve 516 that operates to allow gas that has leaked into the second chamber 504 to exit the device 500. In one example, the auto relief valve 516 can be a hydroscopic valve. In another example, the auto relief valve 516 can include a float the permits the passage of gas but floats on liquid to seal against passage of liquid.

In some implementations, the pressure transfer device 500 can further include one or more liquid pressure sensors 518 positioned to provide sensor readings of the liquid pressure in the pressurized volume of the liquid. For example, as illustrated in FIG. 5, the liquid pressure sensor(s) 518 can be positioned within the second chamber 504. In addition or alternatively to the position of the partition 506, the gas flow control devices 520 and 522 can be controlled based on the sensor readings provided by the liquid pressure sensor(s) 518. For example, the gas flow control devices 520 and 522 can be controlled to adjust the pressure in the first chamber 502 until a desired pressure in the second chamber 504 is achieved.

The one or more controllers 550 can include one or more control devices, units, or components that interface with or otherwise control the one or more flow control devices 520 and 522. As examples, a controller 550 can include one or more chips (e.g., ASIC or FPGA), expansion cards, and/or electronic circuitry (e.g., amplifiers, transistors, capacitors, etc.) that are organized or other configured to control one or more flow control devices (e.g., by way of control signals). In some implementations, a controller 550 can include a processor that loads and executes instructions stored in a computer-readable media to perform operations.

Example Methods

Figure 6:
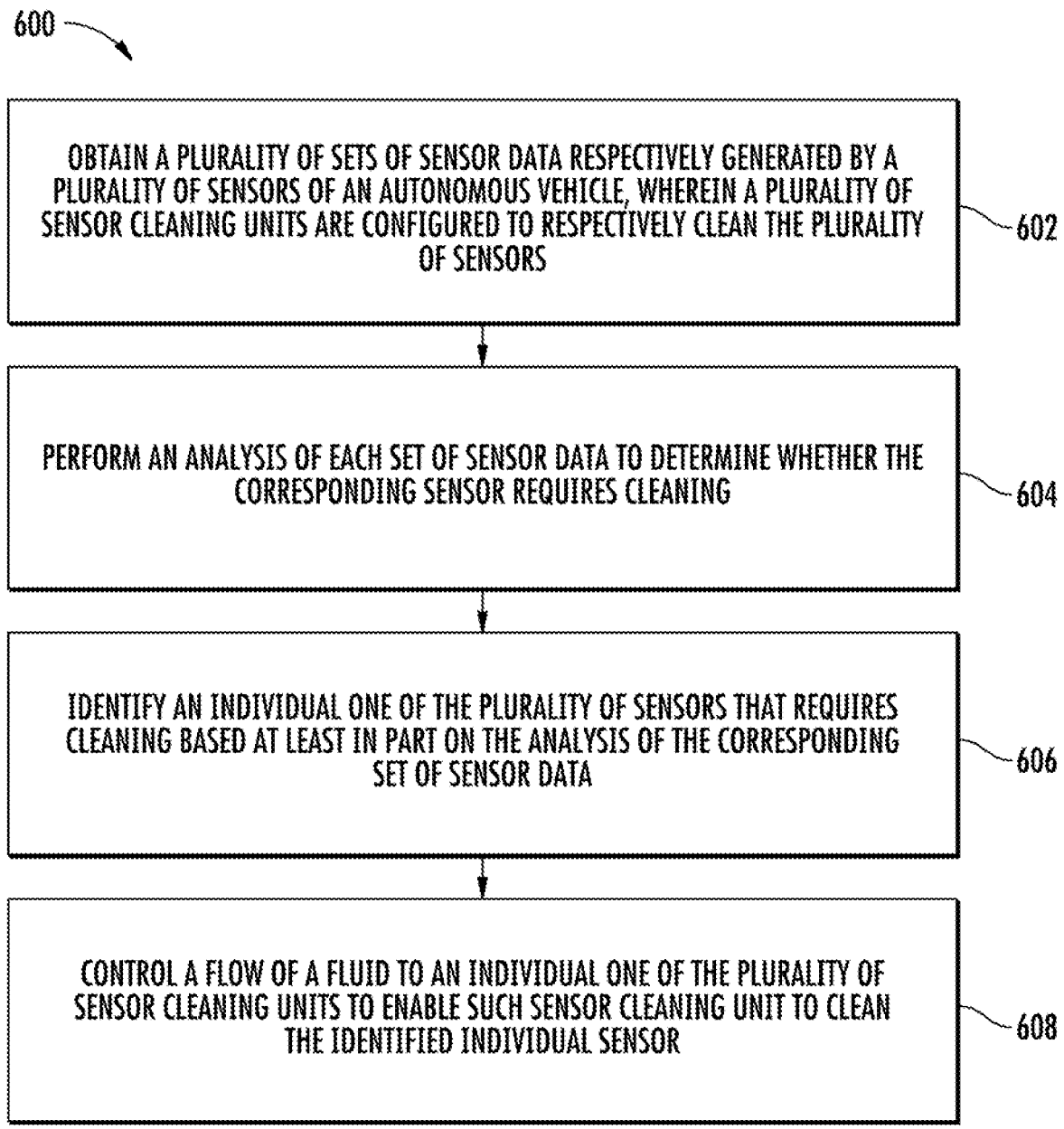
FIG. 6 depicts a flow chart diagram of an example method to perform individualized sensor cleaning according to example embodiments of the present disclosure.

FIG. 6 depicts a flow chart diagram of an example method 600 to perform individualized sensor cleaning according to example embodiments of the present disclosure. Although FIG. 6 depicts steps performed in a particular order for purposes of illustration and discussion, the methods of the present disclosure are not limited to the particularly illustrated order or arrangement. The various steps of method 600 can be omitted, rearranged, combined, and/or adapted in various ways without deviating from the scope of the present disclosure.

At 602, a computing system obtains a plurality of sets of sensor data respectively generated by a plurality of sensors of an autonomous vehicle. A plurality of sensor cleaning units are configured to respectively clean the plurality of sensors. For example, the plurality of sensors can include one or more cameras, Light Detection and Ranging (LIDAR) system sensors, Radio Detection and Ranging (RADAR) system sensors, and/or other sensors. Thus, each sensor can have one or more corresponding sensor cleaning units that are configured to clean such sensor using a fluid (e.g., a gas or a liquid).

At 604, the computing system performs an analysis of each set of sensor data to determine whether the corresponding sensor requires cleaning. At 606, the computing system identifies an individual one of the plurality of sensors that requires cleaning based at least in part on the analysis of the corresponding set of sensor data.

As one example, the plurality of sensors can include a camera that collects imagery and the computing system can determine that the camera requires cleaning based at least in part on one or more characteristics of the imagery captured by the camera. As examples, the computing system can determine that the camera requires cleaning based at least in part on at least one of a sharpness and a brightness of at least a portion of a frame included in imagery captured by the camera. For example, if the sharpness, brightness, and/or other characteristic(s) fall below respective threshold value(s), then it can be determined that the camera requires cleaning. As another example, if the sharpness, brightness, and/or other characteristic(s) decline or otherwise worsen over a number of frames or over time, then it can be determined that the camera requires cleaning. As yet another example, if the sharpness, brightness, and/or other characteristic(s) of a first portion of a frame of imagery captured by the camera are significantly worse than the sharpness, brightness, and/or other characteristic(s) of a second portion of the same frame of imagery, then it can be determined that the camera requires cleaning.

In yet another example, the computing system can detect an occlusion exhibited at a same location in a plurality of frames captured by a camera. For example, a patch of dirt might have accumulated on the camera lens, thereby occluding the camera's field of view over a number of frames of imagery. In response, the computing system can determine that the camera requires cleaning and control the cleaning system to enable cleaning of the camera with a gas and/or a liquid.

As another example, in some implementations, to determine that one or more sensors require cleaning, the computing system can detect a disappearance of an observed object. As an example, if the autonomous vehicle continuously observes a pedestrian over a period of sensor data collection and processing iterations, and then suddenly the pedestrian is no longer observed based on the sensor data, it can be assumed that one or more of the sensors that collected the corresponding sensor data require cleaning. For example, a splash from a mud puddle can have obscured a camera lens, thereby causing the pedestrian to disappear from the sensor data collected by the corresponding camera.

As another example, to determine that one or more sensors require cleaning, the computing system can detect an absence of an object that is expected to be observed. As an example, an autonomous vehicle can be located at a known location at which the autonomous vehicle would expect, for example based on map data, to observe a stoplight. However, if the autonomous vehicle does not observe the stoplight at the expected location, then it can be assumed that one or more of the sensors that would be expected to collect sensor data indicative of the expected object require cleaning. For example, an accumulation of dirt may cause a camera to have an obscured field of view and, therefore, fail to observe the stoplight.

In some implementations, the computing system implementing method 600 can include one or more controllers of a sensor cleaning system and one or more various components of the autonomous vehicle (e.g., a perception system of the autonomous vehicle) that cooperatively operate to perform sensor contamination status detection based on the presence and/or absence of environmental objects observed by the autonomous vehicle in furtherance of its autonomous driving.

At 608, the computing system controls a flow of a fluid to an individual one of the plurality of sensor cleaning units to enable such sensor cleaning unit to clean the identified individual sensor.

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A sensor cleaning system comprising:
   a fluid source that supplies a fluid, wherein the fluid source comprises a tank that stores a pressurized volume of the fluid;
   a flow control device located within the pressurized volume of the fluid and included in a manifold within the tank, wherein the flow control device controls a flow of the fluid from the fluid source; and
   a sensor cleaning unit to clean a sensor of an autonomous vehicle using the fluid from the fluid source that is controlled by the flow control device, wherein the sensor cleaning unit corresponds to the sensor.

2. The sensor cleaning system of claim 1, wherein the sensor cleaning unit comprises an air knife for cleaning the sensor.

3. The sensor cleaning system of claim 2, wherein the air knife comprises a slit through which the fluid is released.

4. The sensor cleaning system of claim 3, wherein the air knife is configured such that the fluid is released through the slit perpendicular to the sensor and sweeps over a face of the sensor.

5. The sensor cleaning system of claim 1, further comprising a controller, the controller configured to determine whether the sensor requires cleaning, and wherein the controller controls the flow control device.

6. The sensor cleaning system of claim 1, wherein the flow control device comprises a solenoid, the solenoid configured to control a respective flow of the fluid.

7. The sensor cleaning system of claim 6, wherein the solenoid is located within the flow control device.

8. The sensor cleaning system of claim 1, wherein the fluid comprises at least one of (i) a gas or (ii) a liquid.

9. The sensor cleaning system of claim 8, wherein the gas is compressed by a compressor.

10. An autonomous vehicle control system, comprising:
    a plurality of sensors; and
    a sensor cleaning system that performs individualized cleaning of the plurality of sensors, the sensor cleaning system comprising:
       a fluid source that supplies a fluid, wherein the fluid source comprises a tank that stores a pressurized volume of the fluid;
       a first flow control device located within the pressurized volume of the fluid and included in a manifold within the tank, wherein the first flow control device controls a first flow of the fluid from the fluid source; and
       a first sensor cleaning unit to clean a first sensor of an autonomous vehicle using the fluid from the fluid source that is controlled by the first flow control device, wherein the first sensor cleaning unit corresponds to the first sensor.

11. The autonomous vehicle control system of claim 10, comprising:
    a second flow control device located within the pressurized volume of the fluid, wherein the second flow control device controls a second flow of the fluid from the fluid source; and
    a second sensor cleaning unit to clean a second sensor of the autonomous vehicle using the fluid from the fluid source that is controlled by the second flow control device, wherein the second sensor cleaning unit corresponds to the second sensor.

12. The autonomous vehicle control system of claim 10, wherein the first sensor cleaning unit comprises an air knife for cleaning the first sensor.

13. The autonomous vehicle control system of claim 12, wherein the air knife comprises a slit through which the fluid is released.

14. The autonomous vehicle control system of claim 12, wherein the air knife is configured such that the fluid is released perpendicular to the first sensor and sweeps over a face of the first sensor.

15. The autonomous vehicle control system of claim 10, wherein the flow control device comprises a solenoid, the solenoid configured to control the first flow of the fluid.

16. The autonomous vehicle control system of claim 15, wherein the solenoid is located within the flow control device.

17. The autonomous vehicle control system of claim 10, wherein the fluid comprises at least one of (i) a gas or (ii) a liquid.

18. The autonomous vehicle control system of claim 17, wherein the gas is compressed by a compressor.

19. An autonomous vehicle, comprising:
- a plurality of sensors; and
- a sensor cleaning system that performs individualized cleaning of the plurality of sensors, the sensor cleaning system comprising:
  - a fluid source that supplies a fluid, wherein the fluid source comprises a tank that stores a pressurized volume of the fluid;
  - a flow control device located within the pressurized volume of the fluid and included in a manifold within the tank, wherein the flow control device controls a flow of the fluid from the fluid source; and
  - a sensor cleaning unit to clean a first sensor of an autonomous vehicle using the fluid from the fluid source that is controlled by the flow control device, wherein the sensor cleaning unit corresponds to the first sensor.

* * * * *